(12) United States Patent
Kondeti

(10) Patent No.: US 11,757,883 B2
(45) Date of Patent: Sep. 12, 2023

(54) BORROWER PRIVACY ENHANCEMENT FOR SHARED-LINE SOLUTIONS

(71) Applicant: T-Mobile USA, Inc., Bellevue, WA (US)

(72) Inventor: Venkata Kondeti, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 40 days.

(21) Appl. No.: 16/904,778

(22) Filed: Jun. 18, 2020

(65) Prior Publication Data

US 2021/0400045 A1 Dec. 23, 2021

(51) Int. Cl.
*H04L 9/40* (2022.01)
*H04W 48/02* (2009.01)
*H04W 8/18* (2009.01)
*H04W 12/082* (2021.01)

(52) U.S. Cl.
CPC .............. *H04L 63/10* (2013.01); *H04W 8/18* (2013.01); *H04W 12/082* (2021.01); *H04W 48/02* (2013.01)

(58) Field of Classification Search
CPC .... H04L 63/10; H04W 12/082; H04W 48/02; H04W 8/18
See application file for complete search history.

(56) References Cited

U.S. PATENT DOCUMENTS

| | | | |
|---|---|---|---|
| 2015/0109909 A1* | 4/2015 | Yeddala | H04W 12/08 370/328 |
| 2015/0215784 A1* | 7/2015 | Gunasekara | H04L 63/102 455/411 |
| 2016/0192344 A1* | 6/2016 | Tiger | H04L 67/104 455/450 |
| 2017/0034253 A1* | 2/2017 | Jiang | H04L 67/10 |
| 2017/0134393 A1* | 5/2017 | Islam | H04W 12/06 |
| 2017/0264742 A1* | 9/2017 | Karimli | H04L 65/1073 |
| 2018/0027353 A1* | 1/2018 | Merino | H04W 88/04 455/436 |
| 2019/0007399 A1* | 1/2019 | Stevens, III | H04W 12/06 |
| 2020/0245160 A1* | 7/2020 | Chu | H04W 48/18 |
| 2021/0243571 A1* | 8/2021 | Gibbs | H04M 3/53 |

* cited by examiner

*Primary Examiner* — Trang T Doan
(74) *Attorney, Agent, or Firm* — Lee & Hayes, P.C.

(57) ABSTRACT

Techniques for sharing or borrowing communication lines are discussed herein. For example, a system can distinguish between a communication line borrower and a communication line owner based on unique user identifiers. The system can identify the communication line borrower as an intended recipient of communication information and user information based on a unique identifier of the communication line borrower that is associated with the communication information and user information by one or more network nodes. The system can secure the shared communication line against activation by the communication line owner and additional communication line borrowers while the shared communication line is assigned to the communication line borrower.

18 Claims, 8 Drawing Sheets

BORROWER PRIVACY ENHANCEMENT FOR SHARED-LINE SOLUTIONS

BACKGROUND

An owner of a communications line can share the communication line with one or more borrowers. Sharing the communication line enables the one or more borrowers to utilize the network and communication features associated with the communication line without being subject to roaming issues, network coverage issues, and other problems associated with a borrower device or a borrower subscription plan. However, communications transmitted via the communication line and information associated with the communications can be received or accessible by the owner and the one or more borrowers.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
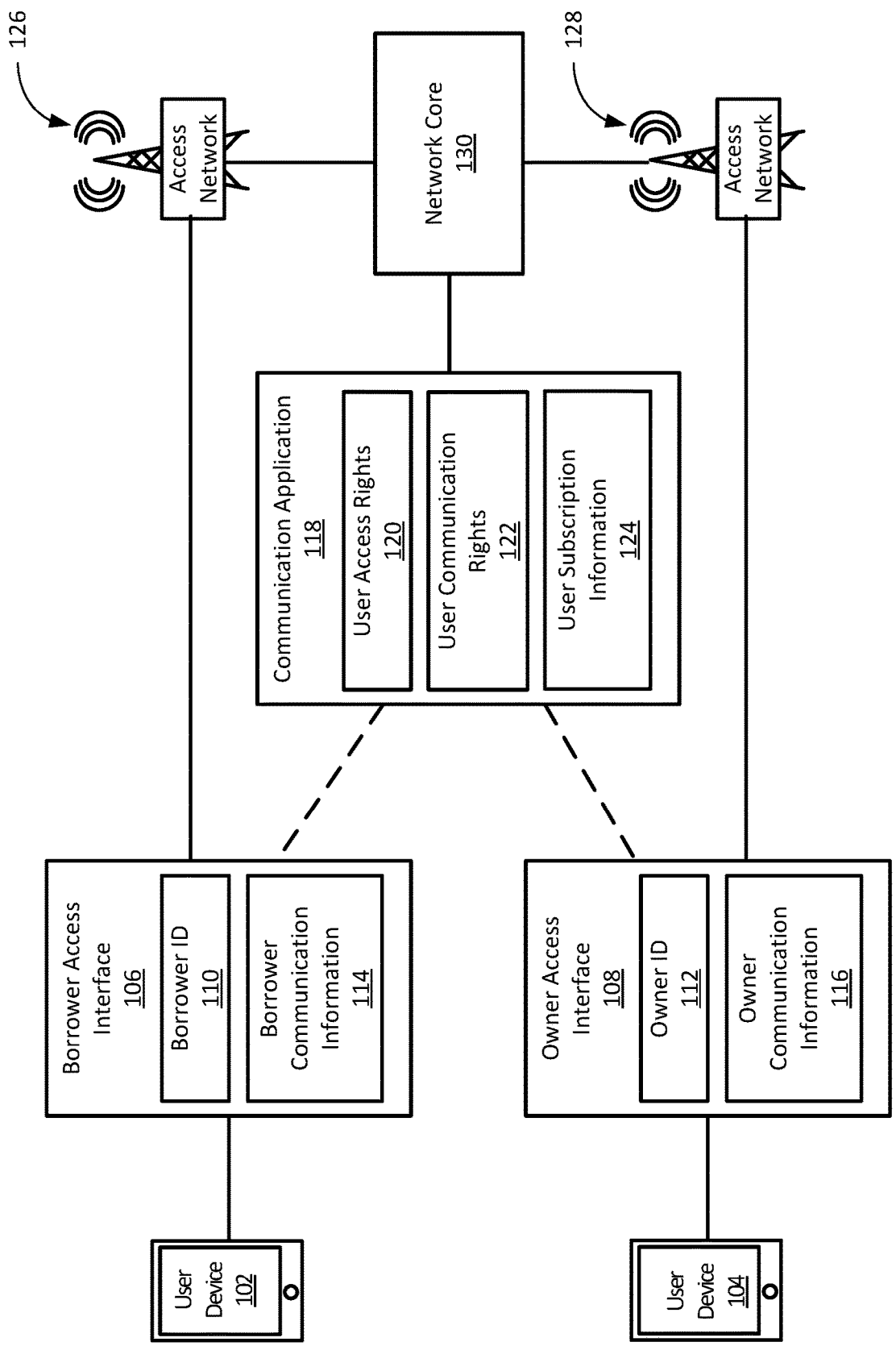
FIG. 1 depicts a network that enables communication line sharing between a first user device and a second user device such that one or more communications received via the communication line can be transmitted to the correct recipient based on user information, access, and communication rights.

This disclosure describes systems, methods, and techniques for managing a communications line that can be shared between a communication line owner and a communications line borrower. The communication line can enable a user device to communicate via an Internet-based network (e.g., Voice over Internet Protocol (VoIP)), an IP Multimedia Subsystem (IMS) network, a public switched telephone network (PSTN), and/or other telecommunication networks. The network can utilize user profile information to identify intended endpoints and/or recipients for communications sessions between user devices and maintain user privacy in shared communication line environments. Additionally, the described systems, methods, and techniques modify access rights and usage rights of the communication line owner and the communication line borrower regarding the shared communication line to secure user information related to the shared communication line.

Additionally, this disclosure describes methods and systems that maintain user privacy while enabling a communication line owner to share a communication line with a communication line borrower. In particular, network nodes can be configured to manage user information, communication information, communication records, and other information associated with the shared communication line based on unique, user-specific IDs. When the communication line owner assigns the shared communication line to the communication line borrower, the network can secure the shared communication line such that the communication line owner does not receive communications transmitted to the communication line borrower. Additionally, the network can be configured to prevent the communication line owner from accessing user information and communication information associated with the communication line borrower. Further, the shared communication line can be configured such that user information and communication information generated and/or transmitted by the communication line borrower can be secured for the communication line borrower such that the user information and the communication information can be freely transferred to a second shared communication line.

Further, this disclosure is directed to systems and methods for managing a communications line that is shared between an owner of the communications line and a user/borrower of the communications line. In particular, the user can be associated with a first user ID. Similarly, the owner can be associated with a second user ID. Additionally, a network node can be configured to determine that the first user ID and/or the second user ID are associated with the communication line. Further, the network node can determine that first user information associated with the user and second user information can be associated with the owner. Accordingly, where the owner has issued a grant access or other command permitting the user to access and utilize the communication line, the first user data can be associated with the first user ID such that the user receives communications via the communication line while the owner of the communication line does not receive the communications.

In at least one embodiment, a communication line owner can have a subscription with a communication service that grants the communication line owner access to one or more virtual communication lines that can be assigned to one or more communication line borrower. In particular, a communication application can be utilized to place calls, receive calls, receive messages, transmit messages, and perform additional communication functions related to the one or more virtual communication lines. Additionally, the communication application can be utilized store contact information, store call logs, and other communication/user information associated with the one or more virtual communication lines. Further, the communication application can permit the communication line owner to transfer access rights for a virtual communication line of the one or more virtual communication lines to a communication line borrower. Accordingly, the communication line borrower can be granted access to the communication functions and features associated with the virtual communication line via the communication application.

In at least one additional embodiment, the communication line owner can be associated with an owner profile that is associated with at least an owner identifier (ID), subscription information, user information, and communication information associated with the communication line owner. Similarly, the communication line borrower can be associated with a borrower profile that is associated with at least a borrower ID, subscription information, user information, and communication information associated with the communication line borrower. Additionally, the communication application can be configured such that communications and information transmitted via the one or more virtual communication lines are at least partially routed based at least on the communications and information including either the owner ID or the borrower ID. Accordingly, the communication application, and network nodes associated with the communication application, can be configured to securely transmit the communications and the information via the one or more virtual lines such the intended recipient receives the communications and the information while other profiles associated with the one or more virtual communication lines are prevented from receiving the communications and the information.

In some embodiments, the systems, devices, and techniques described herein improve the efficiency and functionality for a network by enabling a network node to distinguish between individual users that are associated with a shared communication line. In particular, user profiles can be associated with user devices and grant the user device access to a communication interface and/or a communication application that identifies accessible communication lines and tracks communication information associated with the user profile. Additionally, the user profiles can be further associated with access rights, communication rights, subscription information, usage rights, and other information describing the actions that can be taken by the user profile regarding the communication application and/or communication interface. Further, the network nodes can be configured to route communications based at least on information included in the user profiles.

In some embodiments, a first user (e.g., a communication line borrower) can be restricted from accessing a communication network based at least on subscription information associated with the first user. In particular, the first user can be located outside of a home network or roaming outside of a service area associated with the first user (e.g., the first user can be travelling abroad or in an area where a service provider does not have coverage). Additionally, a second user (e.g., a communication line owner) can be associated with one or more communication lines that have access to the communications network. Accordingly, the second user can assign the one or more communications lines to the first user and/or one or more additional users such that the first user can access the communication network. It should be noted that restricted access to the communication network can indicate that a user device of the first user is prevented from connecting to the communication network, is charged for accessing the communication network, is provided limited connectivity to the communication network, is granted limited features associated with the communication network, is provided limited network access via the communication network (e.g., limited bandwidth, data caps, etc.) and/or is otherwise limited from fully utilizing the communication network.

In some embodiments, one or more users, including at least one of the communication line owner and the communication line borrower, can be associated with one or more user profiles that store user information (e.g., a user information database). In particular, the one or more user profiles can include access rights, access restrictions, communication information, subscription information, and other information associated with the one or more users. Additionally, the access rights associated with a communication line can be modified by the communication line owner to grant the communication line borrower the ability to utilize the communication line through the user device and/or a communication application. Further, the access rights associated with the communication line can be modified by a command such as a grant access command, a transfer access command, a modify access command, and/or other commands that grant, transfer, remove, and/or alter the ability of one or more communication line borrowers to utilize the communication line.

In some embodiments, the communication application and/or control function associated with the communication line can operate to modify access rights associated with the communication line in response to the command issued by the communication line owner. In particular, the communication application (or control function) can operate to modify first access rights associated with the communication line borrower and second access rights associated with the communication line owner in response to the command issued by the communication line owner. Alternatively, the communication application can modify the first access rights associated with the communication line borrower while preserving the access rights associated with the communication line owner.

Currently, sharing communication lines between a communication line borrower and a communication line owner does not offer sufficient privacy measures for the borrower and the owner regarding communications and information associated with the communication line. In particular, communications transmitted via the communication line are commonly transmitted to a first user device associated with the communication line borrower and a second user device associated with the communication line owner regardless of the intended recipient of the communication. Due to both the borrower user device and the owner user device having access rights to the communication line, both the borrower and the owner can access the information associated with the shared line. Further, the shared communication line and the shared access can cause privacy concerns regarding information transmitted via the shared communication line for the communication line borrowers. Accordingly, distinguishing between communications and information intended for either the borrower or the owner provides enhanced privacy for both the borrower and the owner and reduces transmission loads experienced by the network. Additionally, distinguishing between the communication line owner and the communication line borrower enables the network to effectively store information specific to the borrower and the owner for later transfer or user while preventing unauthorized access to the information.

FIG. 1 depicts a network that enables communication line sharing between a first user device and a second user device such that one or more communications received via the communication line can be transmitted to the correct recipient based on user information, access, and communication rights. In particular, a first user device 102 associated with a communication line borrower and a second user device 104 associated with a communication line owner can respectively access a borrower access interface 106 and an owner access interface 108. Additionally, the borrower access interface 106 can associate the first user device 102 with a borrower ID 110 and store borrower communication information 114. Similarly, the owner access interface 108 can associate the second user device 104 with an owner ID 112 and store owner communication information 116. Further, the borrower access interface 106 and the owner access interface 108 can be associated with a communication application 118 that comprises user access rights 120, user communication rights 122, and user subscription information 124. It should be noted that the network can be configured such that the first user device 102, the second user device 104, and the communication application 118 can be connected via a first access network 126, a second access network 128, and/or a network core 130.

In some embodiments, a first user device 102 and/or a second user device 104 can be any suitable computing device configured to communicate over a wireless and/or wireline network, including, without limitation, a mobile phone (e.g., a smart phone), a tablet computer, a laptop computer, a portable digital assistant (PDA), a wearable computer (e.g., electronic/smart glasses, a smart watch, fitness trackers, etc.), a network digital camera, a global positioning system (GPS) device, and/or other similar mobile devices. Although this description may refer to the first user device 102 and/or the second user device 104 as being "mobile" or "wireless," (e.g., configured to be carried and moved around), it is to be appreciated that the first user device 102 and/or the second user device 104 may represent various types of communication devices that are generally stationary as well, such as televisions, desktop computers, game consoles, set top boxes, and the like. In this sense, the terms "communication device," "wireless device," "wireline device," "mobile device," "computing device," "terminal," "user equipment," and "user device" may be used interchangeably to describe a user device capable of performing the techniques described herein. In some examples, the first user device 102 and/or the second user device 104 can have one or more capabilities that require a connection to a control function or a network core 130.

In some embodiments, the borrower access interface 106 can provide the first user device 102 access to one or more shared communication lines. In particular, the borrower access interface 106 can be configured to identify the one or more communication lines that have been shared with the borrower (e.g., the communication line borrower), identify the one or more communication lines that have been activated by the borrower, store borrower communication information 114 associated with the one or more communication lines, and store one or more notifications that have been transmitted to the first user device 102. Additionally, the borrower access interface 106 can be associated with a borrower user profile that tracks user information for the borrower. For example, the borrower user profile can be associated with a unique borrower ID 110 that identifies the borrower for the communication application 118, can track user responses to grant access and other owner commands, can track granted and activated access rights for shared communication lines, can be associated with a borrower subscription that identifies baseline access rights for the user profile, and other information associated with the borrower.

In some embodiments, the owner access interface 108 can provide the second user device 104 access to the one or more shared communication lines owned by the owner (e.g., the communication line owner) that are accessible via the second user device 104. In particular, the owner access interface 108 can be configured to identify the one or more communication lines that have been shared by the owner, identify the one or more communication lines that have been activated by the borrower, store owner communication information 116 associated with the one or more communication lines, and store one or more notifications that have been transmitted to the user device 104. Additionally, the owner access interface 108 can be associated with an owner user profile that tracks user information for the owner. For example, the owner user profile can be associated with a unique owner ID 112 that identifies the owner for the communication application 118, can track owner assignment of access rights and communication rights associated with the one or more shared communication lines, can be associated with an owner subscription that identifies access rights that are available for the owner to utilize and assign, and other information associated with the owner.

In some embodiments, the borrower access interface 106 and the owner access interface 108 can be access interfaces that have been installed on the first user device 102 and the second user device 104. Alternatively, the borrower access interface 106 and the owner access interface 108 can be access portals that are configured such that the first user device 102 and the second user device 104 are capable of utilizing/interacting with the communication application 118 via a network connection. Independent of the specific implementation of the borrower access interface 106 and the owner access interface 108, the borrower and the owner can enter identification credentials that enable the identification and authentication the borrower and the owner as users of the first user device 102 and the second user device 104 respectively. Alternatively, the first user device 102 can be configured such that the communication application 118 determines that the first user device 102 is associated with the communication line borrower and causes the first user device 102 to receive and/or display the borrower access interface 106. Similarly, the second user device 104 can be configured such that the communication application 118 determines that the second user device 104 is associated with the communication line owner and causes the second user device 104 to receive and/or display the owner access interface 108.

In some embodiments, a communication application 118 can be configured to enable the sharing of one or more communication lines between a communication line owner (e.g., the owner) and a communication line borrower (e.g., the borrower). In particular, the communication application 118 can be configured to monitor, maintain, and/or modify user access rights 120, user communication rights 122, and user subscription information 124. Additionally, the communication application 118 can be further configured to route communications transmitted to a shared communication line associated with the owner and the borrower. Further, the communication application 118 can be configured to securely store communication information received and/or transmitted via the shared communication line.

In some additional embodiments, the communication application 118 can be configured to monitor, maintain, and/or modify the user access rights 120 in response to commands, indications, and/or other signals provided by the owner and the borrower. In particular, the user access rights 120 associated with the shared communication lines can be modified in light of commands received from the owner and/or the borrower. In at least one embodiment, the owner can transmit a grant access command to the communication application 118 that specifies at least the borrower that is to receive access rights for one or more communication lines associated with the owner. In particular, the owner can be associated with an account, identified by user subscription information 124, that has access to one or more communication lines that can be shared by the owner. The one or more communication lines can be virtual lines that are associated with a single user account (e.g., a user account associated with the owner) and/or a plurality of user accounts, with a communication line, that are associated with the owner and the second user device 104 (e.g., the user device associated with the owner). Additionally, the grant access command issued by the owner can transfer a selection of some or all of the access rights associated with a communication line to a specified borrower. For example, the grant access command can grant the borrower the ability to make voice calls within one or more specified countries, wherein the communication line associated with the grant access command can be limited to only voice calls within the one or more specified counties or can include other services such as simple messaging services (SMS), multimedia messaging services (MMS), and/or other telecommunication services.

In at least one additional embodiment, the communication application 118 can receive the grant access command and determine that the first user device 102 and the borrower are to be granted access to the selection of or all of the access rights associated with the communication line. In particular, the communication application 118 can determine, based at least on the granted access command, that access rights for the communication line have been granted to the borrower and update the user access rights 120 to reflect the communication line that can be utilized by the first user device 102 via the borrower access interface 106. Additionally, the communication application 118 can determine the borrower ID 110 associated with the borrower and the first user device 102 and associate the updated user access rights 120 with the borrower ID 110. Further, the communication application 118 can transmit a notification (e.g., a push notification, a SMS message, etc.) that indicates the user access rights 120 that have been granted to the borrower ID 110/the borrower to the first user device 102.

In at least one further embodiment, the communication application 118 can determine that the user access rights 120 associated with the owner ID 112/the owner are to be modified based at least on the grant access command. In particular, the owner can forfeit access to the communication line by granting the borrower access to the communication line, causing the communication application 118 to prevent the owner from transmitting and/or receiving information via the communication line that has been shared. It should be noted that while the owner may be prevented from utilizing the communication line, the owner retains the ability to grant access, revoke access, transfer access, and/or modify access to the communication line. Alternatively, the communication application 118 can modify the user access rights 120 such that certain actions taken by the owner have prerequisites. For example, after the owner issues a grant access command for the communication line, the communication application 118 can implement a prerequisite that the owner issue a revoke access command for the borrower before the owner can issue an additional grant access or transfer access command. Similarly, the communication application 118 can implement an additional prerequisite that the own issue a revoke access command for the borrower before the owner can activate the communication line for the second user device 104 and/or the owner ID 112.

In some further embodiments, after the communication application 118 receives the grant access command from the communication line owner, the communication line can be activated by the communication line borrower. In particular, after the communication application 118 has updated the user access rights 120 to reflect the grant access command, the borrower can be instructed to activate the communication line so that communications can be transmitted and received via the first user device 102 and/or the borrower access interface 106. For example, the communication line that was shared with the borrower by the owner can be displayed by the borrower access interface 106 such that a current status of the line can be identified (e.g., indication that the borrower currently has access to the communication line, that access to the communication line has been revoked, that the communication line is currently in use, that the communication line is inactive, that the communication line requires activation for the borrower/the first user device 102, etc.). Accordingly, the communication application 118 can receive a communication line activation, from the borrower, via the borrower access interface 106 that enables the first user device 102 to transmit and receive communications via the communication line.

In some embodiments, user access rights 120 can determine actions that may be taken by a communication line borrower, identified by the borrower ID 110, and actions that may be taken by a communication line owner, identified by the owner ID 112. In particular, the borrower can be prevented from utilizing the communication line before the owner has issued a grant access, transfer access, and/or modify access command. Additionally, the user access rights 120 can reflect the commands issued by the owner and enable the borrower to transmit calls, receive calls, transmit messages, receive messages, and otherwise interact with various communication methods supported by the communication line. Further, the user access rights 120 can be updated to revoke communication line access for the borrower in response to a revoke access, transfer access, and/or modify access command issued by the owner or in response to a deactivation command issued by the borrower. In at least one embodiment, and as noted above, the borrower can be instructed to provide an activation command for the communication line prior to utilizing the features of the communication line granted according to the user access rights 120. In at least one additional embodiment, the user access rights 120 can also specify restrictions that are associated with the ability of the owner to utilize the communication line. For example, access right modification by the owner can be gated behind a revocation of access for the user. Alternatively, activation and/or use of the communication line by the owner can be restricted where the communication line has been shared with the borrower.

In some embodiments, user communication rights 122 can be utilized by the communication application 118, to determine how information associated with the owner and/or the borrower can be distributed and handled. In particular, the communication rights 122 can determine communication information that is to be transmitted and/or displayed on the borrower access interface 106 and the owner access interface 108. Additionally, the communication rights 122 can include the borrower ID 110, the owner ID 112, or other unique user ID that identifies individual users that are permitted to access to the communication information (e.g., the borrower communication information 114 or the owner communication information 116). For example, the user communication rights 122 can be utilized to restrict access to one or more contacts, one or more stored communications, a communication history, and other communication information that is associated with the utilization of one or more communication lines by the borrower, wherein the one or more communication lines can include shared communication lines. Accordingly, the user communication rights 122 can enable the communication application 118 to determine whether borrower communication information 114 can be provided to requests received from individual communication lines. Further, the user communication rights 122 can cause the communication application 118 to transfer borrower communication information 114 between communication lines when the borrower receives access, the access for the borrower is revoked, the borrower activates, the borrower deactivates, and/or the borrower otherwise indicates that the borrower can utilize or will no longer utilize the communication line.

In some embodiments, the first user device 102, the second user device 104, and the communication application 118 can be configured to communicate via a first access network 126, a second access network 128, and a network core 130. In particular, the first access network 126 and the second access network 128 can independently be selected from wireless modems (e.g., Wi-Fi, WiMax, Bluetooth, infrared signals, etc.), wired connections (e.g., ethernet, fiber-optic, DSL, broadband, etc.), telecommunication access networks (e.g., eNodeB, gNodeB, NodeB, radio access network (RAN), etc.), and/or other access technologies that enable the first user device 102 and the second user device 104 to access the network core 130.

Figure 2:
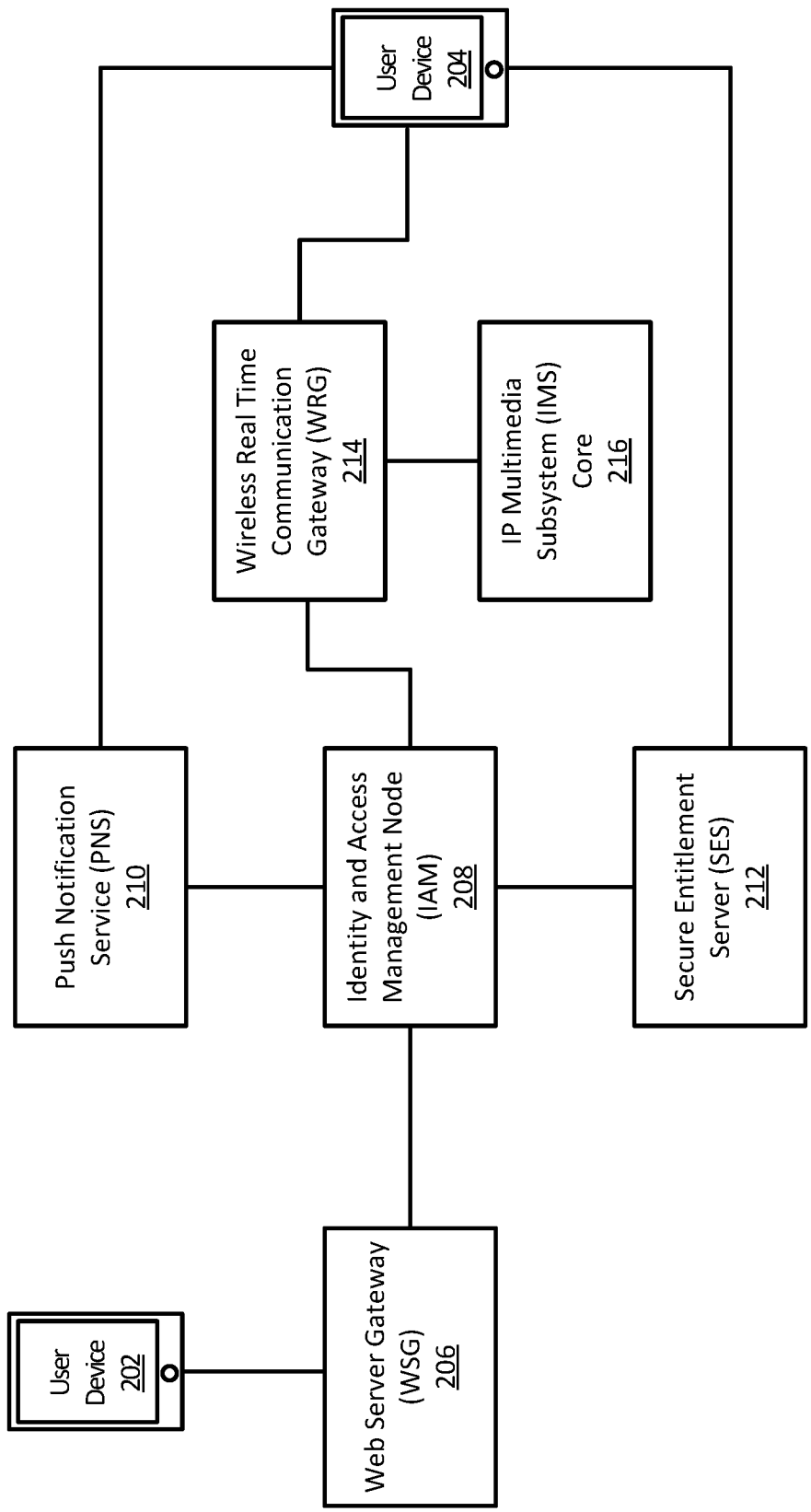
FIG. 2 depicts a network core comprised of signaling network nodes, communication nodes, and other network nodes that enable the sharing of a communication line between an owner user device and one or more borrower user devices.

FIG. 2 depicts a network core comprised of signaling network nodes, communication nodes, and other network nodes that enable the sharing of a communication line between an owner user device and one or more borrower user devices. In particular, a first user device 202 can initiate a call to a second user device 204 via a web server gateway (WSG) 206. Additionally, the call can be routed through an identity and access management node (IAM) 208 configured to interact with a push notification service (PNS) 210, a secure entitlement server (SES) 212, and/or a web real time communication gateway (WRG) 214. Further, the WRG 214 can provide connection(s) to user devices via an IMS Core 216 or to the second user device 204 to initiate a VoIP session between the first user device 202 and the second user device 204.

In some embodiments, a WSG 206 can operate as a control function for a communication session. In particular, the WSG 206 can transmit information to and receive information from the first user device 202 for the establishment of communication sessions via the Internet-based network, for the verification and authentication of user profile logins, for the validation of user profile and/or communication information from network databases, and other network functions associated with at least the first user device 202. Additionally, the WSG 206 can be configured as the initial point of contract between the first user device 202 and the network for incoming and outgoing communications associated with a communication session. Further, the WSG 206 can be configured to handle communication line owner commands such as grant access commands, transfer access commands, modify access commands, and revoke access commands that modify access rights associated with one or more shared communication lines of an owner subscription account.

In some embodiments an IAM 208 can perform identification and verification functions for the communication session between the first user device 202 and the second user device 204. In particular, the shared communication line environment can cause information associated with a plurality of users to be transmitted over the shared communication lines. Accordingly, the IAM 208 can be configured to maintain information and data security by securing communication information and user information independent of user device, communication line, and access rights. Additionally, the IAM 208 can be configured to maintain access rights associated with communication line borrower user profiles and communication line owner user profiles such that access right modifications enabling or revoking user access to communication lines are maintained for the user profiles. Further, the IAM 208 can be in communication with the WSGs 206 and the WRGs 214 to establish communication sessions, PNS 210 to issue notifications to the first user device 202 and the second user device 204, and SES 212 to exchange information with the user devices.

In some additional embodiments, the IAM 208 can be configured to maintain information and data security for the first user device 202 and the second user device 204. In particular, user profile information and communication information associated with at least one of a first user profile associated with the first user device 202 and a second user profile associated with the second user device 204 can be secured based at least on user IDs that are unique to the first user profile and the second user profile. As noted above, the user profile information and the communication information can be secured independent of access right modifications for the shared communication lines and changes in user device and user profile associations. Additionally, the association between the user profile information and the communication information enables the IAM 208 and/or databases associated with the IAM 208 to prevent access to the information unless a provided user ID associated with the user profile requesting access to the information matches the user ID originally associated with the information. For example, contact lists, message logs, communication logs, and other communication information associated with the second user profile of the second user device 204 can be associated with a user ID that is unique to the second user profile. Accordingly, access requests for the communication information associated with the second user profile can be denied access unless the access request includes the user ID associated with the second user profile, even if the access request originates from the second user device 204. It should be noted that while the information can be associated with the user ID from the originating user profile, the user ID can be modified at a later date after verification of the user profile and/or a user associated with the user profile.

In some further embodiment, the IAM 208 can be configured to identify intended recipients of incoming communications. In particular, a shared communication line can be associated with a plurality of users, including a communication line owner and a communication line borrower. Additionally, the IAM 208 can identify a communication line and a user ID associated with incoming communication session requests. Accordingly, the IAM 208 can determine, based at least on the user ID associated with the communication session request, that one or more communications are intended for the first user device 202 or the second user device 204. Further, additional users associated with the shared communication line can be prevented from receiving the one or more communications based at least on additional user IDs associated with the additional users not matching the user ID associated with the one or communications. For example, a communication session that identifies a user ID associated with a communication line borrower can be secured by the IAM 208 such that a communication line owner does not and/or cannot receive communications associated with the communication session.

In some embodiments, a PNS 210 and a SES 212 can provide notifications and messaging functions between the second user device 204 and the IAM 208. In particular, the PNS 210 can provide push notification services from the IAM 208 to user devices where access rights have been updated, communication information as been logged by a database, and/or other events have taken place regarding the user device and/or the user profile. The push notifications can be transmitted to one or more user devices associated with the user profile through active logins. Additionally, the user profile that is to receive the push notification can be identified based at least on the unique user ID identified by the event associated with the push notification. Similarly, the SES 212 can provide information exchange services between the IAM 208, databases associated with the IAM 208, and the one or more user devices associated with the user profile through active logins. For example, the SES 212 can be utilized to request communication logs, contact information, communication history, and other information associated with the user profile. It should be noted that an active login can represent an instance where a user has provided a username and password associated with the user profile that allows a communication application to access the unique user ID and other information associated with the user profile. Alternatively, an active login can be identified by a two-factor authentication process wherein the user is authenticated via communication with alternative contact methods (e.g., email, SMS, authentication application, etc.).

In some embodiments a WRG 214 can operate as a control function for the communications session. In particular, the WRG 214 can be configured to route communication sessions and communications between the first user device 202 and the second user device 204 via the WSG 206 and the IAM 208. Additionally, the WRG 214 can be configured to route communications sessions and communications between Internet-based networks and telecommunication networks (e.g., 3G, 4G, 5G, etc.). Further, the WRG 214 can be configured to transmit information requests and information between user devices, databases and the IAM 208 based at least on information queries and query responses that have been validated based at least on a unique user ID.

In some embodiments, an IMS Core 216 can represent a collection of network nodes configured to transmit telecommunication signals over a 3G, 4G, 5G, or other telecommunication network. In particular, the IMS Core 216 can comprise one or more access networks, one or more control functions, one or more telephony application servers, and other network nodes that enable the establishment of communication sessions between two or more user devices. Additionally, a telephony application server can be configured to route and establish communication sessions, similar to the IAM 208, between user devices associated with the telecommunication networks (e.g., 3G, 4G, and 5G networks) and the second user device 204 via the WRG 214. Further, a call-session control function can be configured to perform similar functions as the WSG 206 or the WRG 214 depending on whether the user device initiating the communications session resides on the Internet-based network or the telecommunication networks represented by the IMS Core 216. For example, where the first user device 202 initiates the communication session with the additional user device associated with the IMS Core 216, the connection can be similarly routed through the WSG 206, the IAM 208, and the WRG 214 to the IMS Core 216. Alternatively, where the second user device 204 receives the communication session request, the IMS Core 216 can connect with the second user device 204 can be connected via the WRG 214.

Figure 3:
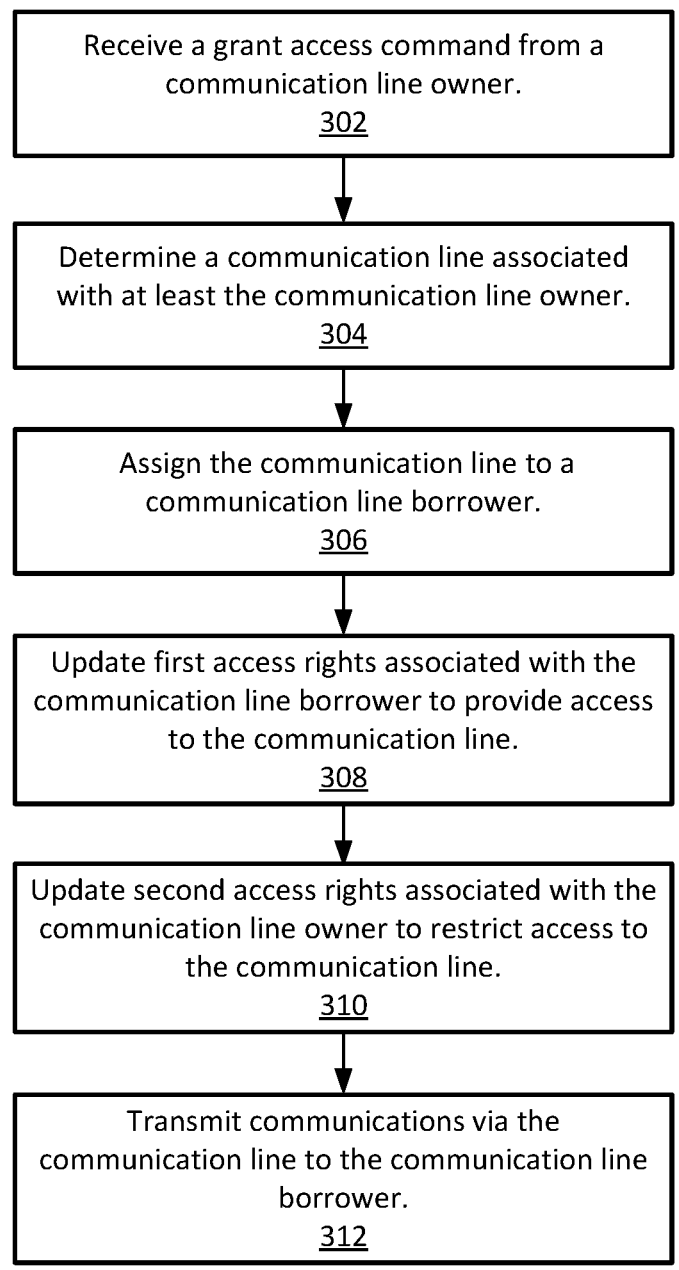
FIG. 3 is a flowchart describing a method for granting access rights to a communication line borrower and restricting access rights for a communication line owner in response to a grant access command.
Figure 4:
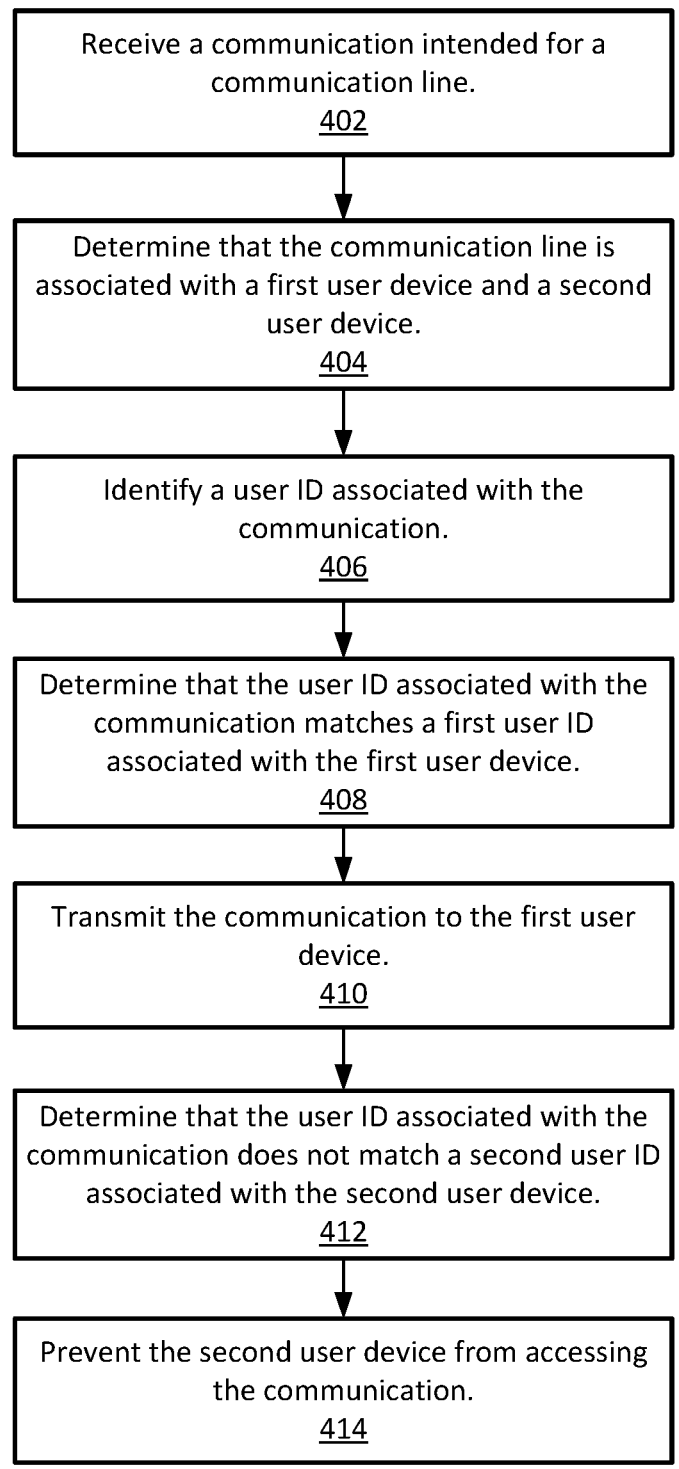
FIG. 4 is a flowchart describing a method for routing communications transmitted via a shared communication line based at least on a user ID associated with the transmitted communications.

FIGS. 3 and 4 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel (or omitted) to implement the processes.

FIG. 3 is a flowchart describing a method for granting access rights to a communication line borrower and restricting access rights for a communication line owner in response to a grant access command. In particular, a communication line owner can issue a grant access command that causes an Identity and Access Management node (IAM) in a network to alter the routing of communications associated with a communication line associated with the grant access command.

At block 302, a control function (e.g., an IAM) in a network can receive a grant access command from a communication line owner. In particular, the grant access command can include at least one of a communication line, a recipient (e.g., a communication line borrower), access rights to be granted to the recipient, a duration of the grant access command, and other details that can alter utilization of the communication line by the recipient. Alternatively, the grant access command can include only the recipient that is to be granted access to a communication line. Additionally, the grant access command can be a transfer access command, a revoke access command, a modify access command, or other modification of access rights for one or more individuals associated with the communication line.

At block 304, the control function can determine a communication line associated with at least the communication line owner that issued the grant access (or modify access) command. In particular, the control function can be configured to identify one or more communication lines associated with the communication line owner. Additionally, the control function can be configured to identify one or more communication lines that are currently unassociated with a user when the grant access command is received by the control function. For example, an owner user profile associated with the communication line owner can include a primary communication line utilized by the communication line owner, one or more additional communication lines that have been assigned to one or more other user profiles, and one or more available communication lines that have not been assigned to a user profile. Accordingly, the control function can determine an unassigned communication line that is associated with the communication line owner.

In some additional embodiments, the control function can identify one or more communication lines that are associated with the communication line owner account. In particular, the grant access command can cause the control function to identify the one or more communication lines independent of whether the one or more communication lines are associated with other user profiles. Additionally, the one or more communication lines can be identified based at least on one or more identifiers that are provided by the grant access command. Alternatively, the grant access command can specify one or more coverage areas, one or more communication services, and/or other communication line features associated with the one or more communication lines that are identified by the control function. Accordingly, the control function can operate to identify the one or more communication lines independent of the current utilization of the one or more communication lines and/or based on the communication line features specified by the grant access command.

At block 306, the control function can be configured to assign the communication line to the communication line borrower specified by the grant access command. In particular, the control function can identify the recipient of the grant access command as a communication line borrower. Additionally, the control function can identify a borrower user profile associated with the communication line borrower. Further, the control function can operate to inform the communication line borrower that at least a communication line of the one or more communication lines has been assigned to the communication line borrower. The communication line borrower can be informed of the assignment through a message sent via contact information associated with the borrower user profile, a push notification transmitted to one or more user devices associated with the borrower user profile, and/or a via a notification associated with the borrower user profile. Accordingly, the communication line borrower can be informed of the communication line that has been assigned for use via the borrower user profile.

In some additional embodiments, the communication line can be activated by the communication line borrower once the communication line has been assigned to the borrower user profile. In particular, the assignment of the communication via the grant access command (or modify/transfer command) can be a unilateral action (e.g., the communication line owner unilaterally assigns the communication line to the borrower user profile) or a bilateral action (e.g., the communication line borrower can elect to activate the communication line for the borrower user profile after the communication line owner has issued the grant access command). Additionally, the communication line can be activated by the communication line borrower in response to the message, the push notification, and/or the notification transmitted to the communication line owner after the grant access command causes the control function to associate the borrower user profile with the communication line. Further, an activation command, transmitted by the communication line borrower, can cause the control function to activate the communication line for the borrower user profile and enable the communication line to be utilized via the borrower user profile.

At block 308, the control function can update first access rights associated with the communication line borrower to provide access to the communication line. In particular, the control function can be configured to update the first access rights stored in association with the borrower user profile that enable functions and features associated with the communication line for utilization by the communication line borrower. Additionally, the grant access command can cause the control function to modify access rights associated with the communications line for a previous borrower and/or other individuals associated with the communications line (e.g., other individuals associated with a subscription account of the communication line owner). Further, the grant access command can cause the control function to modify how communications for the communication are handled by the control function. Accordingly, the modification of the access rights can alter communication handling by the control function such that communications can be analyzed and an intended recipient for the communication can be determined from at least the borrower user profile.

At block 310, the control function can update second access rights associated with the communication line owner to protect the privacy of the communication line borrower. In particular, the control function can be configured to update the second access rights associated with the communication line owner such that the communication line cannot be transferred to an additional communication line borrower and/or utilized by the communication line owner without a revoke access command being issued for the communication line that revokes the grant access command for the communication line borrower. Additionally, the second access rights can be updated to prevent the communication line owner from accessing communication information (e.g., call history, messaging history, contact lists, etc.) associated with the communication line and/or the communication line borrower.

At block 312, the control function can transmit communications via the communication line to the communication line borrower. In particular, the control function can be configured to send one or more communications from at least the communication line borrower to one or more contacts associated with the borrower user profile. Additionally, the control function can be configured to receive one or more additional communication from the one or more contacts and determine that the one or more additional communications are addressed to the communication line borrower. It should be noted that the one or more contacts can include both stored numbers associated with the borrower user profile and unknown numbers that are not stored in association with the borrower user profile.

In some additional embodiments, the control function can determine that the one or more additional communications are intended for the communication line borrower based at least on the borrower user profile. In particular, the borrower user profile can be associated with a borrower user ID and the owner user profile can be associated with an owner user ID. Additionally, the one or more additional communications can include an indication that specifies at least one of the borrower user ID and the owner user ID, wherein the control function can route the communication based on the indication such that either the communication line borrower or the communication line owner receives the one or more additional communications. Further, despite both the communication line owner and the communication line borrower having access and/or being associated with the communication line, the one or more communications and the one or more additional communication can be secured by either the owner user ID or the borrower user ID depending on whether the communication line owner or the communication line borrower is associated with the communications. The control function can be configured such that access to the communication information is permitted where a user ID of a user profile attempting to access the communication information matches either the owner user ID or the borrower user ID.

FIG. 4 is a flowchart describing a method for routing communications transmitted via a shared communication line based at least on a user ID associated with the transmitted communications. In particular, and as referenced above, the user profile associated with the transmitted communication can be identified based at least on the user ID such that communications associated with the user ID are received by an intended recipient while other user profiles associated with the communication line are prevented from accessing communication information associated with the transmitted communication.

At block 402, a control function can receive a communication via a communication line. In particular, the control function can receive a communication that is associated with an established communication session or that is configured to initiate a communication session. Additionally, the control function can establish the communication session in response to a determination that the communication is unassociated with an existing communication session. Accordingly, the control function can identify or create a communication session, associated with the communication, that can be utilized to store a call log comprised of communication information related to the communication and/or the communication session.

At block 404, the control function can determine that the communication line is associated with a first user device and a second user device. In particular, the control function can determine that a first user profile (e.g., a borrower user profile) is associated with the first user device (e.g., a first user logged into the first user profile on the first device) and a second user profile (e.g., an owner user profile) is associated with the second user device, wherein the first user profile and the second user profile have been granted access rights for the communication line. In at least one embodiment, the control function can determine first access rights associated with the first user profile and second access rights associated with the second profile, wherein the first access rights can indicate that the first user device can receive communications via the communication line while the second access rights indicate that the second user device cannot receive communications via the communication line. In at least one additional embodiment, the control function can determine that the first access rights and the second access rights permit the first user device and the second user device to receive communications via the communication line. Accordingly, the control function can determine that the communication line is a shared communication line that can be access by a communication line borrower and a communication line owner.

At block 406, the control function can identify a user ID associated with the communication. In particular, the communication received by the control function can include an indication of a user ID that further identifies an intended recipient for the communication received via the communication line. Additionally, the user ID associated with the communication can be utilized by the control function to distinguish between the first user device and the second user device when transmitting the communication to the intended recipient. Further, the control function can determine a first user ID associated with the first user profile or a second user ID associated with the second user profile matches the user ID provided with the communication. It should be noted that user IDs are unique to individual user profiles and enable to distinguish between the communication line owner, the communication line borrower, and any additional users associated with the communication line.

At block 408, the control function can determine that the user ID associated with the communication matches the first user ID associated with the first user device and the first user profile. In particular, the control function can determine the first user ID associated with the first user profile and the second user ID associated with the second user profile and determine that the user ID identifies the first user profile as the intended recipient for the communication. Additionally, the control function can determine that a communication log that is created for the communication is to be associated with the first user profile based at least on the first user ID matching the user ID. The communication log can track the communication, additional communication associated with the communication session, and record communication information for later access. Accordingly, the control function can identify the intended recipient for the communication and secure the communication and future communications associated with the communication session against access from other users.

At block 410, the control function can transmit the communication to the first user device. In particular, the control function can complete the communication session and connect the first user device with a source for the communication. Additionally, and based at least in part on the connected communication session, the control function can transmit communication responses from the first user device to the source for the communication and receive additional communications for the first user device from the source. As noted above, the communication responses and the additional communications can be stored in association with the first user ID and the communication session such that the communication information is available for access via the first user profile.

At block 412, the control function can determine that the user ID associated with the communication and/or the communication session does not match the second user ID associated with the second user device. In particular, the control function can determine that the second user profile associated with the second user ID is to be restricted from receiving and/or accessing communication information associated with the communication session between the first user profile and the source of the communication. Additionally, the control function can determine that the second user profile is to be restricted from accessing communication logs, contact information associated with the communication line, and other communication information associated with the communication line based at least on the second access rights associated with the second user profile. Accordingly, and as recited by block 414, the second user device can be prevented from accessing the communication and the communication information associated with the first user profile.

Figure 5:
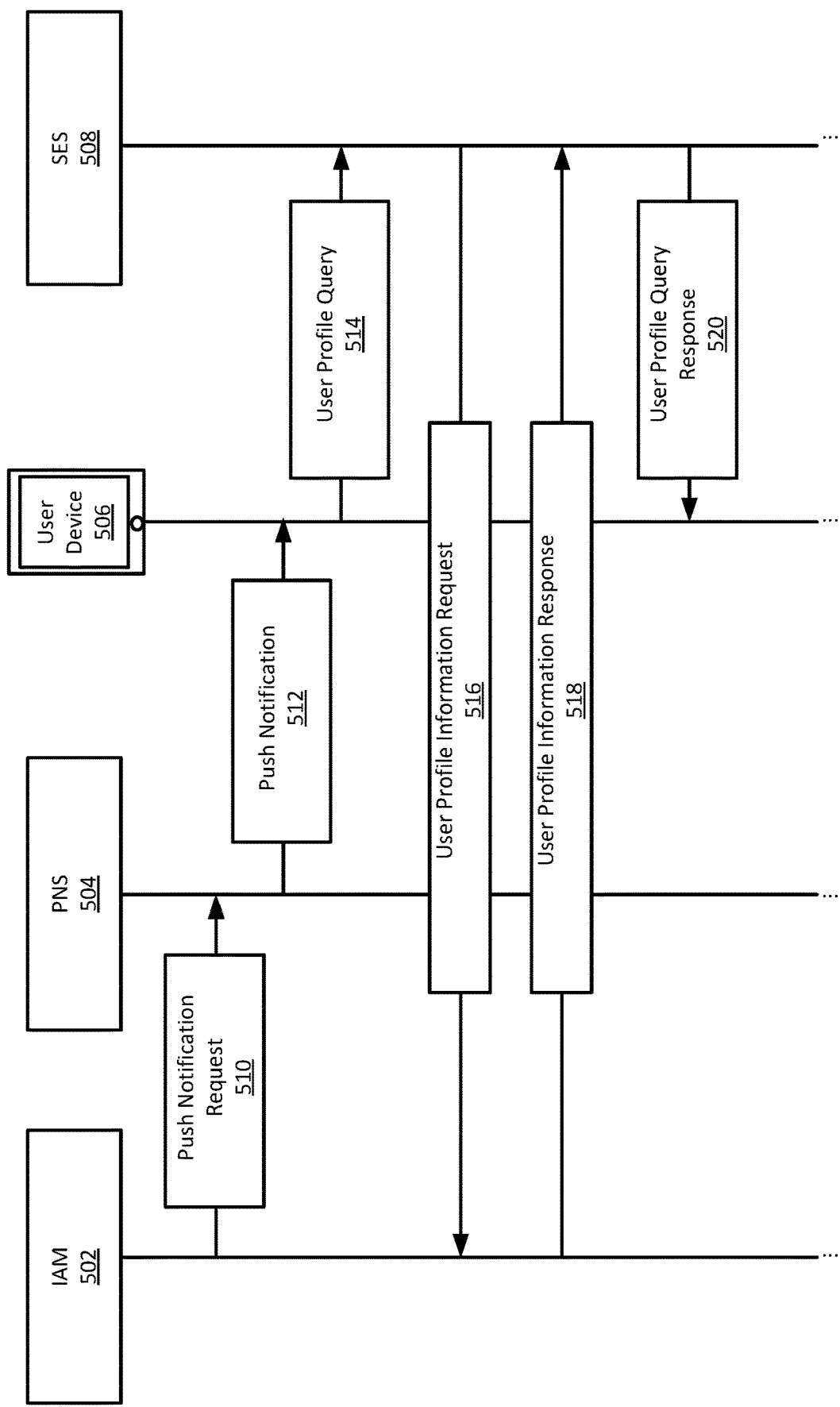
FIG. 5 is a timing diagram for pushing notification and information to a communication line borrower while ensuring communication information privacy for the borrower.

FIG. 5 illustrates a timing diagram for providing notifications and information to a communication line borrower while ensuring communication information privacy for the borrower. In particular, an Identity and Access Management node (TAM) 502 can utilize a Push Notification Service (PNS) 504 to deliver information, notifications, and requests to a user device 506. The user device 506 can further utilize a Secure Entitlement Server (SES) 508 or other communication service to respond the message transmitted by the TAM 502.

In some embodiments, the TAM 502 can issue, provide, or otherwise send a push notification request 510 that is transmitted to the PNS 504. The push notification request 510 can include a request for information, a notification of an update for a user profile associated with the user device 506, a notification of a grant access command (or transfer/modify/revoke access command), and/or other notifications that are to be presented via the user device 506. Additionally, the TAM 502 can operate to issue the notification(s) in response to external actions for the user profile associated with the user device 506. For example, where the user profile is granted access to a communication line via a grant access command, the grant access command can identify the user profile and cause the TAM 502 to generate the push notification request 510. Alternatively, the user profile can be identified as the recipient of a communication received via a shared communication line, causing the TAM 502 to generate the push notification request 510. Further, the user profile can be identified by the grant access command and/or the communication including a unique user ID associated with the user profile.

In some embodiments, the PNS 504 can receive the push notification request 510, from the IAM 502 and transmit a push notification 512 to the user device 506. In particular, the push notification 512 can be formatted to provide information from the push notification request 510 and to cause the user to respond to the push notification 512. For example, where a grant access command has been issued by a communication line owner, the push notification request 510 can indicate that the user device 506 is to be informed of updated access rights associated with the user profile that enable the user device 506 to utilize a shared communication line. Additionally, the push notification request 510 can indicate that the shared communication line is to be activated for the user device 506 via an activate shared communication line command issued by the user device 506. Accordingly, the push notification 512 can be formatted to include an indication that the access rights for the user profile have been updated and that further action is required to utilize the shared communication line with the user device 506.

In some embodiments, the user device 506 can receive the push notification 512 from the PNS 504. In particular, the PNS 504 can transmit the push notification 512 to the user device 506 and cause the user device 506 to display the push notification 512. Additionally, where the push notification 512 is formatted to prompt a response to the push notification 512, the user device 506 can include a portal and/or a link for completing the response to the push notification 512. Alternatively, the push notification 512 can be displayed via the user device 506 and request that further action is taken in response to the push notification 512.

In some embodiments, the user device 506 can initiate a user profile query 514 in response to the push notification 512 via a messaging service (e.g., the SES 508). In particular, the user device 506 can initiate the user profile query 514 in response to the push notification 512, such that a user profile information request 516 can be transmitted from the messaging service to the IAM 502. Additionally, the user profile query 514 and the user profile information request 516 can identify the user profile associated with the user device 506 for the IAM 502. It should be noted that while a user associated with the user profile can log into and/or access the user profile via the user device 506, information associated with the user profile can be stored by the IAM 502, a database associated with the IAM 502, and/or other network nodes communicatively connected to the IAM 502. Accordingly, the user profile query 514 and the user profile information request 516 can be transmitted from the user device 506 to the IAM 502 via the message service. Further, the user profile query 514 and the user profile information request 516 can provide identification information (e.g., a user ID associated with the user profile) such that the IAM 502 can verify the user profile associated with the user device 506.

In some additional embodiments, the user profile query 514 and the user profile information request 516 can include a response to the push notification request 510. In particular, the user profile query 514 and the user profile information request 516 can include user actions such as an activate communication line command, an update user profile information command, and/or other actions that provide information to the IAM 502. As noted above, the user profile query 514 and the user profile information request 516 can include identification information such that the IAM 502 can verify the user profile associated with the user device 506. The verification of the user profile can ensure that the user device 506 has permission to view, receive, modify, update, and otherwise interact with user information stored by the user profile. For example, the IAM 502 can be configured to receive the user profile information request 516 and determine whether the login credentials for the user profile on the user device 506 are valid, whether the user profile associated with the user device 506 has permission to view the user information associated with the user profile, and/or whether the user profile associated with the user device 506 has permission to update or modify the user profile. Further, the IAM 502 can identify the user profile based at least on a user ID that is associated with the user profile and is unique to the user profile.

In some embodiments, the IAM 502 can respond to the user profile information request 516 with a user profile information response 518 that causes the messaging service to transmit a user profile query response 520 to the user device 506. In particular, the user profile query response 520 can include requested user information, updated user profile attributes, confirmation of a command issued by the user device 506 (e.g., activate communication line), and/or other actions requested by the user profile query 514. Additionally, the IAM 502 can be configured to transmit the user profile information response 518 to the user device 506 associated with the user profile information request 516 and/or to transmit the user profile information response 518 to one or more additional user devices associated with the user profile. Accordingly, the IAM 502 can be configured to provide the requested information via secured communication pathways such that user information is provided to and/or modified by user devices that have been verified as associated with the user profile. Further, the IAM 502 can secure user information for a communication line borrower against access by a communication line owner and other users associated with the communication line through verification of the unique user ID associated with the user profile.

Figure 6:
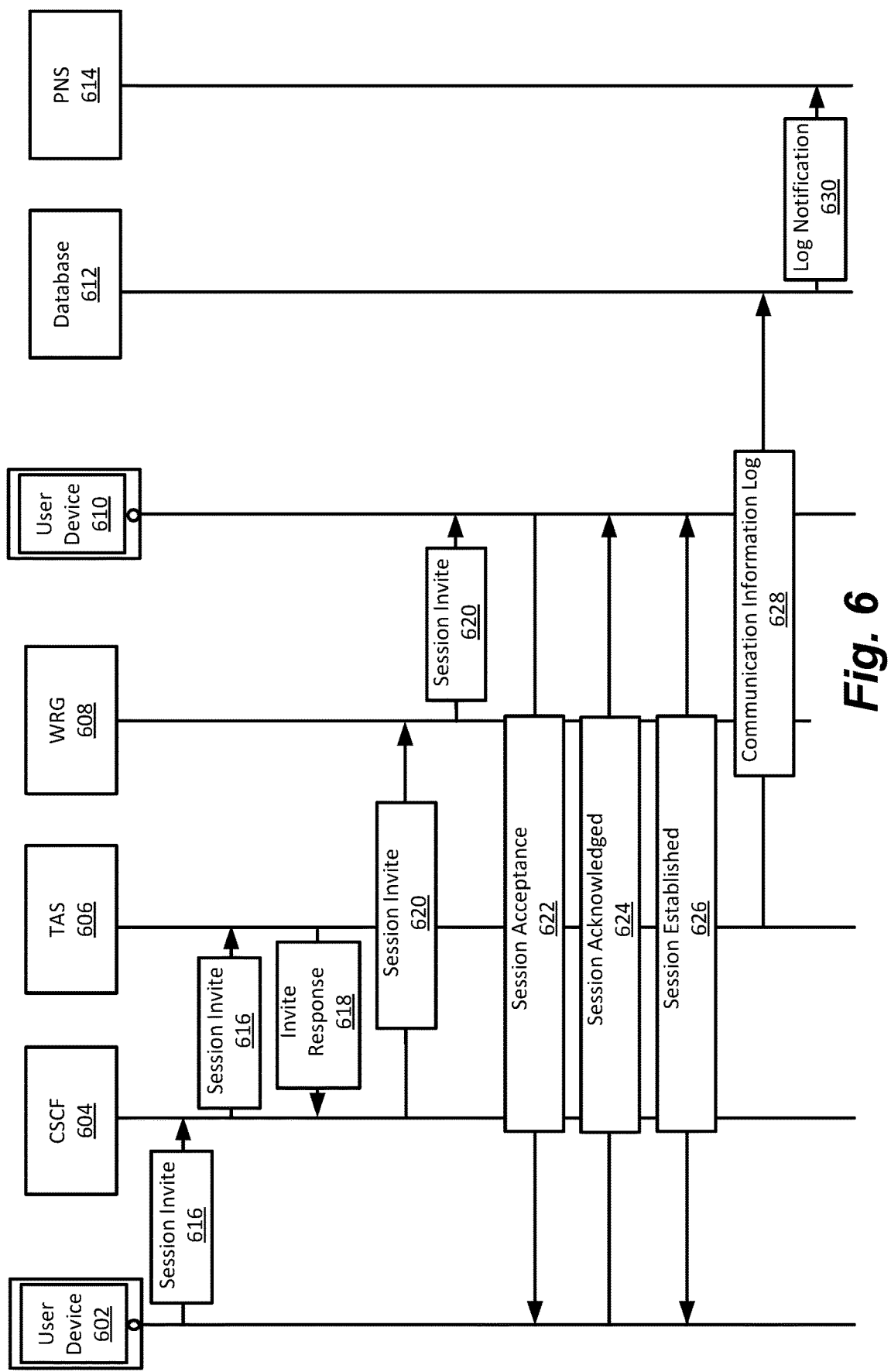
FIG. 6 is a timing diagram for establishing a connection between a caller associated with an IMS network and borrower user device and storing communication information for a communication line borrower.

FIG. 6 is a timing diagram for establishing a connection between a caller associated with an IMS network and borrower user device and storing communication information for a communication line borrower. It should be noted that while FIG. 6 displays a timing diagram for a caller associated with the IMS network, individual network nodes could be modified to represent communication over an Internet-based communication network. In particular, a first user device 602 can initiate a communication through a Call Session Control Function (CSCF) 604, a Telephony Application Server (TAS) 606, and a Web Real Time Communication Gateway (WRG) 608 to a second user device 610. Additionally, communication information associated with the communication can be stored by database 612, wherein a user can be informed of the communication information via a push notification issued by PNS 614. Further, where the caller is associated with an Internet-based communication network, the CSCF 604 can be replaced by a Web Server Gateway (WSG) and the TAS 606 can be replaced by an Identity and Access Management node for communication routing and control function purposes.

In some embodiments, a communication session between the first user device 602 and the second user device 610 can be initiated via a session invite 616 transmitted from the first user device 602, and/or a first user profile associated with the first user device 602, to the CSCF 604 and forwarded from the CSCF 604 to the TAS 606. In particular, the session invite 616 can identify the second user device 610 and/or a second user profile associated with the second user device 610 as the intended recipient via a unique user ID associated with the second user profile. Additionally, the TAS 606 can receive the session invite 616 and determine that the second user device 610 and/or the second user profile utilizes a shared communication line that is associated with the second user profile and a communication line owner. Accordingly, the TAS 606 can utilize the unique user ID to determine that the second user device 610 and/or the second user profile is the intended recipient of the session invite 616 and prevent the transmission of the session invite 616 to the communication line owner. Further, the TAS can transmit an invite response 618 that identifies the WRG 608 that the session invite 616 is to be routed through for the CSCF 604.

In some embodiments, the CSCF 604 can forward a session invite 620 to the WRG 608 that can be routed by the WRG 608 to the second user device 610. In particular, the CSCF 604 can identify the WRG 608 based at least on information provided by the TAS 606 via the invite response 618. Additionally, based at least on the TAS 606 verifying the second user device and/or the second user profile as the intended recipient for the session invite 620, via the unique user ID, the WRG 608 can transmit the session invite 620 to the second user device 610. Further, a communication session can be established via a sequence of a session acceptance message 622 transmitted from the second user device 610 to the first user device 602 and a session acknowledged message 624 transmitted from the first user device 602 to the second user device 610. It should be noted that the session acceptance message 622 and the session acknowledge message 624 can be transmitted via the CSCF 604, the WRG 608, and, optionally, the TAS 606. Accordingly, a session can be established at block 626 between the first user device 602 and the second user device 610.

In some embodiments, a communication information log 628 can be posted to database 612 during the communication session or after the communication session has been terminated. In particular, the TAS 606 can be configured to report one or more communications that occur between the first user device 602 and the second user device 610 via the communication session established at block 626. Additionally, the database 612 can be configured to store the one or more communications as a communication information log 628 that is received from the TAS 606. Further, the TAS 606 and the database 612 can be configured to associate the communication information log 628 with the unique user ID such that the communication information log 628 is secured against access by user profiles not associated with the unique user ID. It should be noted that the database 612 can transmit a log notification 630 to the PNS 614 such that the second user device 610 and/or the second user profile is notified of the communication information log 628.

Figure 7:
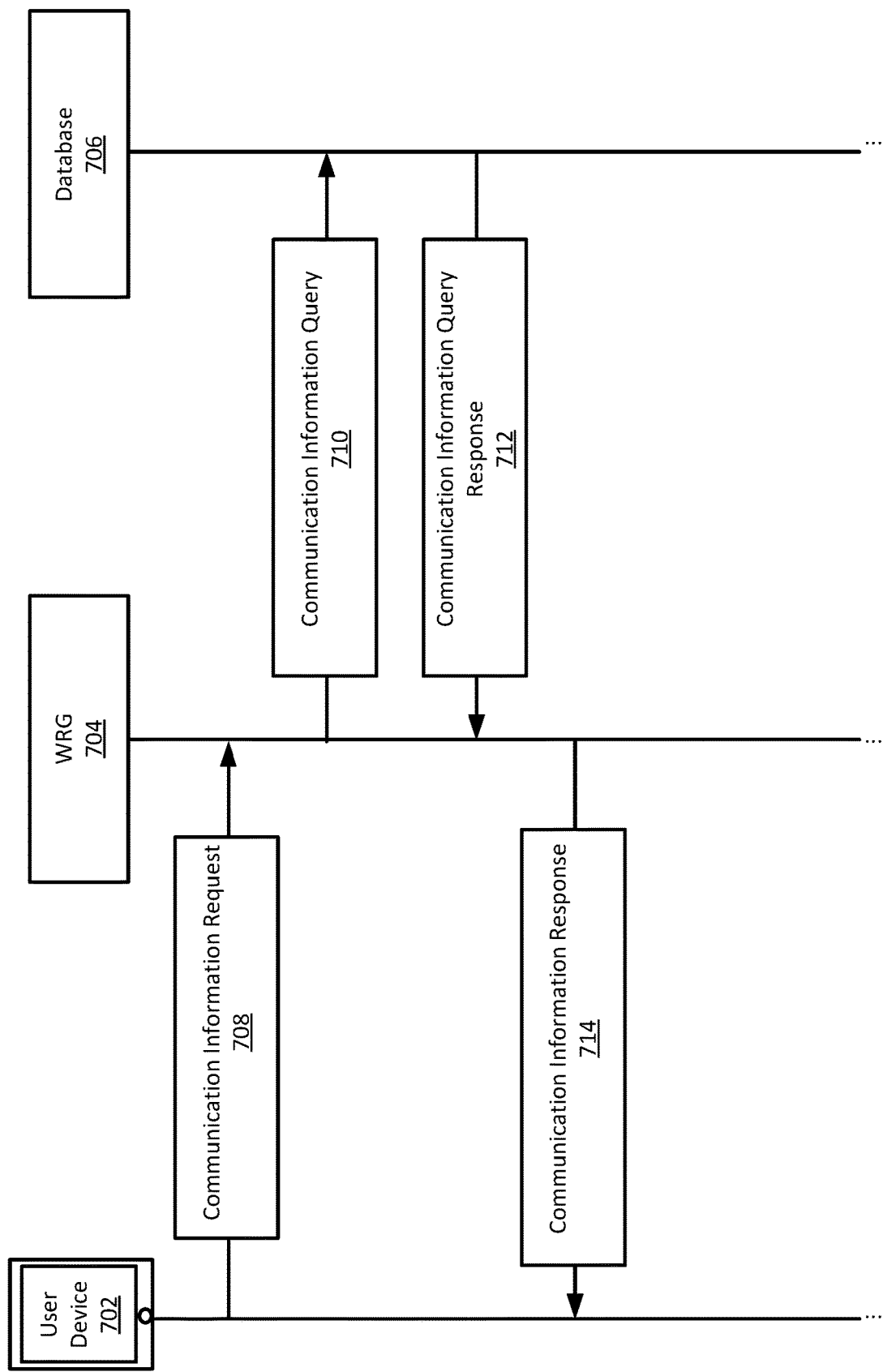
FIG. 7 is a timing diagram for retrieving communication information associated with a shared communication line that is requested by a communication line owner.

FIG. 7 is a timing diagram for retrieving communication information associated with a shared communication line that is requested by a communication line owner. In particular, a user device 702 can access communication information stored by a database 706 through information requests transmitted via WRG 704.

In some embodiments, the user device 702 can transmit a communication information request 708 to the WRG 704 and cause the WRG 704 to forward a communication information query 710 to the database 706. In particular, the user device 702 can transmit a communication information request 708 that identifies communication information, associated with a communication session via a shared communication line, that is to be provided to the user device 702. Additionally, the communication request 708 can include verification information comprised of a unique user ID associated with a user profile of a communication line borrower. It should be noted that the user device 702 can be associated with the shared communication line or unassociated with the shared communication line. For example, the communication information requested by the user device 702 can be generated by a communication session utilizing a shared communication line that the user profile previously was granted access to. Further, the communication information generated by the communication session can be stored by the database 706 in association with the unique user ID of the user profile. Accordingly, the communication information can be secured by the unique user ID independent of the shared communication line.

In some additional embodiments, the WRG 704 can determine whether the user device 702 and the user profile associated with the user device 702 have access rights to the communication information stored by the database 706. As noted above, the WRG 704 can be configured to validate the unique user ID associated with the communication information and determine whether the unique user ID is associated with the user profile and determine whether the user profile is associated with the user device 702. In at least one embodiment, the WRG 704 can query the database 706 via the communication information query 710 and receive the communication information and the unique user ID associated with the communication information via the communication information query response 712. Additionally, the WRG 704 can determine, based at least on the communication information query response 712, that the unique user ID associated with the communication information matches the unique user ID associated with the user profile and permit the communication information to be transmitted to the user device 702 via the communication information response 714. In at least on additional embodiment, the WRG 704 can be in communication with a control function (e.g., an IAM, a TAS, etc.) that performs validation of the user device 702 and the user profile to determine whether the user profile has access rights for the communication information. Accordingly, the control function can determine that the user device 702 is permitted to receive the communication information based at least on a determination that the unique user ID associated with the communication information matches the unique user ID associated with the user profile. Further, and based at least on the validation performed by the control function, the WRG 704 can transmit the communication information query 710 to the database 706 and transmit communication information received via the communication information query response 712 to the user device 702 via the communication information response 714.

It should be noted that the above timing diagram depicts a selection of embodiments for communication information to be secured via a unique user ID. In general, the control function, databases, and web gateways can be configured to associated the unique user ID of a user profile with communications and communication information such that access to the communications and the communication information is granted in response to a determination that a requesting user profile is associated with the unique user ID independent of the association between a communication line and the user profile. Accordingly, access rights for a shared communication line can be revoked, transferred, and/or modified by a communication line owner without preventing a communication line borrower from accessing borrower communication information and without allowing the communication line owner or other communication line borrowers to access the borrower communication information.

Figure 8:
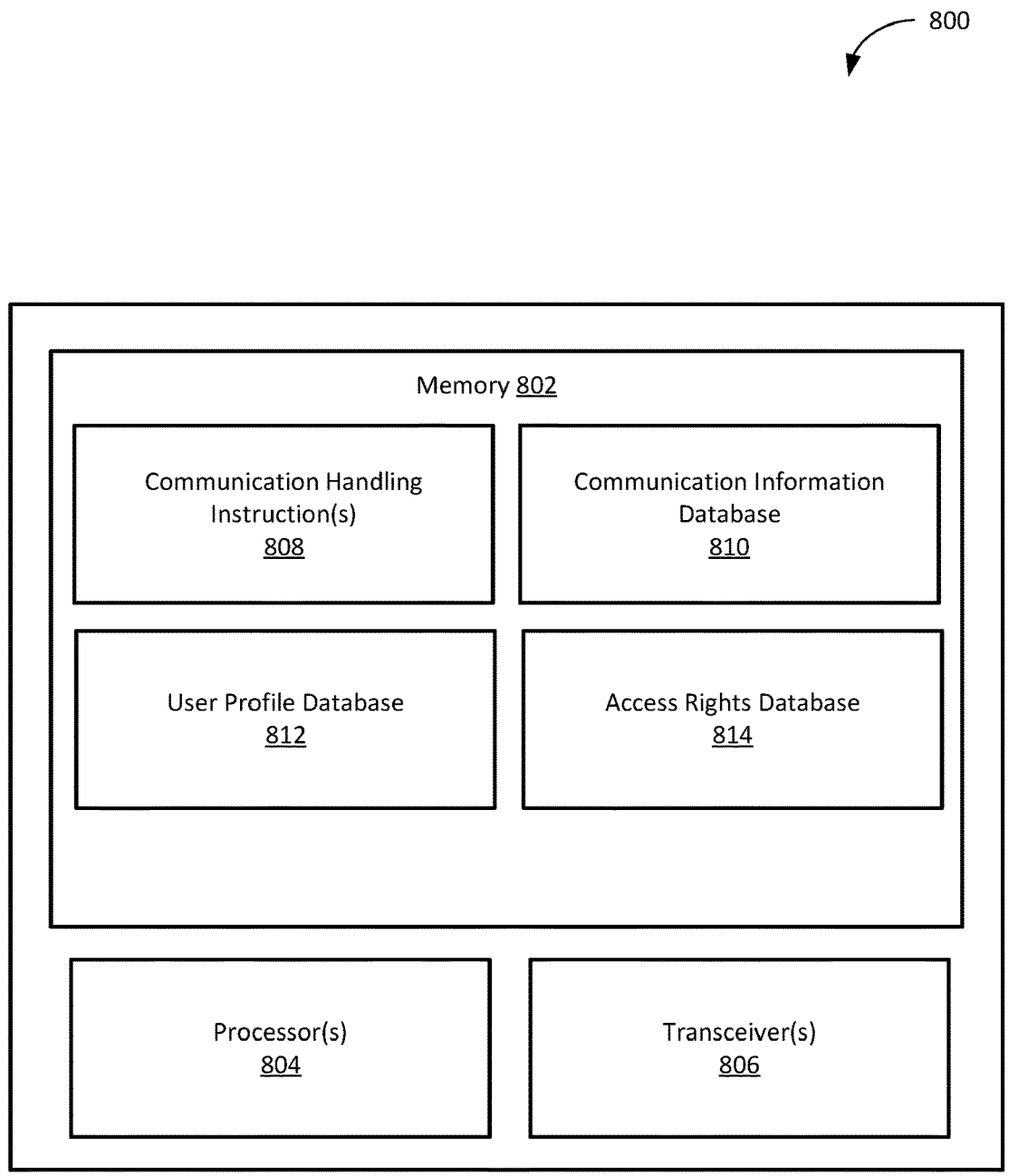
FIG. 8 is a block diagram of a control function capable of implementing the methods disclosed herein, in accordance with some examples of the present disclosure.

FIG. 8 illustrates a block diagram of a control function capable of implementing the methods disclosed herein, in accordance with some examples of the present disclosure. In some embodiments, control function 800 is can correspond to any of the control functions discussed in FIGS. 1-7. As illustrated, control function 800 is generally comprised of memory 802, one or more processors 804, and one or more transceivers 806.

In some embodiments, memory 802 is volatile (such as RAM), non-volatile (such as ROM, flash memory, etc.) or some combination of the two. Memory 802 may include removable storage, non-removable storage, and other forms of computer-readable media including, but not limited to RAM, ROM, EEPROM, flash memory, other memory technologies, CD-ROM, DVDs, content-addressable memory (CAM), other optical storage, magnet storage, and any other medium which can be used to store the desired information in a format that can be accessed by control function 800. Memory 802 can comprise one or more instructions 808 that are executed by processors 804 and cause processors 804 to perform operations of the methods discussed above. Further, memory 802 can comprise additional modules that can be executed by processors 804 and cause processors 804 to perform additional operations associated with control function 800. The additional modules can comprise communication forwarding modules, communication monitoring modules, and other network modules.

In some embodiments, processors 804 can include one or more central processing units (CPUs), one or more graphics processing units (GPUs), both CPUs and GPUs, or other processing units or components known in the art.

In some embodiments, transceivers 806 can include one or more wired or wireless transceivers. For example, transceivers 806 can include a network interface card, a network adapter, a LAN adapter, an address associated with a network connection, or another device permitting communications to be sent and received. Additionally, transceivers 806 can comprise any wireless transceiver capable of engaging in wireless, radio frequency (RF) communication. Further, transceivers 806 can include additional wireless modems, such as Wi-Fi, WiMax, Bluetooth, and/or infrared communication modems.

In some additional embodiments, transceivers 806 can be configured to transmit communications via Internet-based communication networks, 3G networks, 4G networks, 5G network, and other communication networks. Internet-based communication networks can include networks that utilize the Internet of Things, provided by Internet Service Providers, that interconnect various user devices and enable signals to be freely transmitted between the various user devices. Additionally, Universal Mobile Telecommunication Systems (UMTS) is an example of a 3G network, although there are other 3G network infrastructures that may implement the following methods and systems. Long Term Evolution (LTE) and Evolved High-Speed Packet Access (HSPA+) are examples of 4G networks, although there are other 4G network infrastructures that may implement the following methods and systems. 5G networks are the next generation of mobile networks that are designed to combine both an evolution and revolution of the existing LTE/LTE-A mobile networks.

In some embodiments, communication handling instructions 808 can cause processors 804 and transceivers 806 to perform operations that comprise the methods discussed above. These operations include, but are not limited to, granting of access rights to a communication line borrower, revoking access rights for a communication line borrower, modifying access rights associated with a shared communications line, securing communication information associated with a shared communication line, and/or providing access to communication information, as described with respect to FIGS. 1-7.

In some embodiments, a communication information database 810 can comprise communication information generated by a first user device and a second user device associated with a communication session. In particular, where the communication session occurs via a shared communication line, the communication information database 810 can be configured to store communication information of the first user device in association with a first unique ID of a first user profile logged in the first user device. Similarly, the communication information database 810 can be configured to store communication information of the second user device in association with a second unique ID of a second user profile logged into the second user device. Accordingly, the communication information can be secured by the control function 800 such that access to the communication information is granted based on a determination that a user device is associated with either the first user profile or the second user profile based at least on the first unique ID or the second unique ID. It should be noted that the association of the communication information with the first unique ID and/or the second unique ID enables the communication information to be access by the first user profile and/or the second user profile independent of the communication line utilized to generate the communication information.

In some embodiments, a user profile database 812 can comprise user profile information secured by a unique ID associated with a user profile. In particular, the user profile database 812 can store user profile information including contact information, contact aliases for a user associated with the user profile (e.g., email addresses, alternative phone numbers, etc. associated with the user), subscription plans associated with the user profile, and other information related to the user and the user profile. Additionally, the user profile database 812 can store the user profile information in association with the unique ID associated with the user profile such that a user device can access the user profile information based at least on a valid user profile login on the user device and the unique ID associated with the user device and the unique ID associated with the user profile database 812 matching.

In some embodiments, an access rights database 814 can comprise access rights that have been granted to user profiles associate with communication line borrowers by communication line owners. In particular, the access rights database 814 can include descriptions of access rights associated with individual user profiles and the shared communication lines. Additionally, the access rights database 814 can be utilized by the control function 800 when establishing communication sessions and issuing push notifications for the user profiles via the shared communication lines. Accordingly, communication rights, privileges, and features for the shared communication lines can be detailed for the communication network and can be available for modification by the communication line owner and/or the communication line borrowers.

In some additional embodiments, the access rights database 814 can comprise access rights associated with user profiles of communication line owners. In particular, the communication line owner can grant a communication line borrower access to a shared communication line. The grant access command can cause the control function to modify both the access rights for the communication line borrower and the communication line owner within the access rights database 814. For example, access rights of the communication line owner can be modified in response to the grant access command to prevent reassignment of the shared communication line to an additional communication line borrower without a revoke access command for the communication line borrower, prevent communication line owner access or activation of the shared communication line without a revoke access command for the communication line borrower, and/or prevent communication line owner access to utilization of the shared communication line by the communication line borrower.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
receiving, from a first user profile, a grant access command associated with a communication line and a second user profile;
assigning, based at least on the grant access command, the communication line to a first user identifier (ID) associated with the second user profile, wherein the communication line is further assigned to a second user ID associated with the first user profile;
receiving a communication associated with the communication line, the communication including the first user ID;
determining, based at least on the communication including the first user ID, that the communication is to be transmitted to the second user profile; and
determining, based at least on the communication line and the first user ID, that communication information transmitted via the communication line is limited to access by the second user profile; and
in response to the determining that the communication information transmitted via the communication line is limited to access by the second user profile, transmitting the communication to a user device on which the second user profile has activated the communication line such that the first user profile is prevented from accessing the communication, wherein determining that the communication is to be transmitted to the second user profile further comprises:
determining that the first user ID of the second user profile is associated with the communication line; and
determining that the second user profile has activated the communication line on the user device.

2. The method of claim 1, further comprising:
receiving an additional grant access command associated with the communication line and a third user profile;
determining that the second user profile is associated with the communication line; and
preventing the third user profile from being associated with the communication line.

3. The method of claim 1, further comprising:
receiving, from the first user profile, a revoke access command associated with the communication line and the second user profile; and
determining, based at least on the revoke access command, that second communication information transmitted via the communication line is limited to access by the first user profile.

4. The method of claim 3, further comprising:
receiving, from the first user profile, a second grant access command associated with the communication line and a third user profile;
assigning, based at least on the second grant access command, the communication line to a third user ID associated with the third user profile; and
determining, based at least on the third user ID being associated with the communication line, that a second communication is to be transmitted to the third user profile.

5. A system comprising:
one or more processors; and
a memory that includes one or more computer-executable instructions that cause the one or more processors to perform operations comprising:
determining that a first user profile is associated with a plurality of communication lines, the first user profile having ownership rights and usage rights for the plurality of communication lines;
receiving, from the first user profile, a first indication that causes a usage right associated with a communication line of the plurality of communication lines to be transferred from the first user profile to a second user profile;
receiving, from the second user profile, a second indication activating the communication line on a user device associated with the second user profile;
modifying, based at least on the first indication, an access right for the first user profile that prevents the first user profile from receiving communication information associated with the communication line; and
transmitting, based at least on the first indication and the second indication, the communication information associated with the communication line to the user device.

6. The system of claim 5, wherein:
the first indication specifies a user identifier (ID) associated with the second user profile, wherein the user ID is a unique ID associated with the second user profile; and
transmitting the communication information to the user device is further based at least on the user device being associated with the unique ID of the second user profile.

7. The system of claim 6, wherein:
the second indication that activates the communication line on the user device comprises at least the user ID of the second user profile; and
activating the communication line on the user device further comprises:
determining, based at least on the user ID, that the second indication was transmitted by a user associated with the second user profile; and enabling, based at least on the second indication being transmitted by the user, the communication line for sending and receiving the communication information for the user device.

8. The system of claim 6, wherein an additional user device associated with the first user profile is prevented from accessing the communication information associated with the communication line based at least on the first user profile being associated with an additional unique ID different from the user ID of the second user profile.

9. The system of claim 5, wherein modifying the access right for the first user profile further comprises at least one of:
preventing the first user profile from issuing a third indication that grants the usage right to third user profile while the usage right is associated with the second user profile;
preventing the first user profile from issuing a fourth indication that activates the communication line for an additional user device associated with the first user profile while the usage right is associated with the second user profile; or
preventing the first user profile from accessing the communication information associated with the communication line while the usage right is associated with the second user profile.

10. The system of claim 9, wherein the first user profile is permitted to issue at least one of the third indication or the fourth indication based at least on a revoke usage right command being transmitted by the first user profile, wherein the revoke usage right command transfers the usage right from the second user profile to the first user profile.

11. The system of claim 5, the operations further comprising:
determining, based at least on the first indication and the second indication, that the communication information is to be cataloged in association with the second user profile; and
securing, based at least on a unique ID associated with the second user profile, a catalogue of the communication information, wherein access to the catalogue requires a request for the communication information to include at least the unique ID.

12. The system of claim 11, the operations further comprising:
determining that the second user profile has been disassociated from at least one of the communication line or the user device; and
accessing, based at least on the unique ID, the catalogue of the communication information via at least one of a third user device or a second communication line.

13. A method comprising:
determining that a user profile has received a first set of access rights for a communication line from an owner profile, wherein the owner profile is an additional user profile configured to retain a second set of the access rights for the communication line and associated with a subscription for the communication line;
determining that the user profile has activated the communication line on a user device associated with the user profile;
assigning the communication line to a user ID associated with the user profile, wherein user information associated with the communication line is secured by the user ID; and
transmitting, based on the assigning of the communication line to the user ID and via the communication line, one or more communications associated with the user ID to the user device such that the owner profile is prevented from receiving the one or more communications associated with the communication line;
the method further comprising:
receiving, via the communication line, an incoming communication;
determining, based at least on an indication associated with the incoming communication, that the incoming communication is addressed to the user profile, wherein the indication includes at least the user ID;
transmitting the incoming communication to the user profile; and
preventing the owner profile from receiving the incoming communication.

14. The method of claim 13, wherein the access rights include at least one of:
a first right to assign the communication line for use by the user profile or one or more additional user profiles;
a second right to revoke the use of the communication line by the user profile or the one or more additional user profiles;
a third right to activate the communication line for the user device;
a fourth right to record the one or more communications and communication information associated with the communication line; or
a fifth right to send and receive the one or more communications, via the communication line.

15. The method of claim 14, wherein the first set of the access rights granted to the user profile by the owner profile includes the first right, the third right, the fourth right, and the fifth right.

16. The method of claim 14, wherein the second set of the access rights retained by the owner profile includes the second right, wherein utilization of the second right grants the owner profile the first right, the third right, the fourth right, and the fifth right.

17. The method of claim 13, wherein securing the user information comprises preventing distribution of the user information in response to one or more user information queries.

18. The method of claim 17, further comprising:
determining that a user information query of the one or more user information queries includes at least the user ID; and
transmitting a user query response in response to the user information query.

* * * * *